July 2, 1957

W. STEIN 2,798,093

METHOD FOR THE SEPARATION OF WATER-INSOLUBLE DICARBOXYLIC ACIDS FROM THEIR MIXTURES WITH OTHER WATER-INSOLUBLE MATERIALS

Filed April 27, 1955

Crystallization of sebacic acid from a hot solution of its monosodium salt

Concentration of solution used, in % by weight of sebacic acid

INVENTOR.
Werner Stein

BY

ATTORNEYS

Crystallization of decanedicarboxylic acid from
a hot solution of its monsodium salt Concentration of solution used, in % by weight
of decanedicarboxylic acid INVENTOR.
Werner Stein Crystallization of brassylic acid from a hot solution of its monosodium salt Concentration of solution used, in % by weight of brassylic acid July 2, 1957 W. STEIN 2,798,093
METHOD FOR THE SEPARATION OF WATER-INSOLUBLE
DICARBOXYLIC ACIDS FROM THEIR MIXTURES WITH
OTHER WATER-INSOLUBLE MATERIALS
Filed April 27, 1955 4 Sheets-Sheet 4

INVENTOR.
Werner Stein

ATTORNEYS

United States Patent Office 2,798,093
Patented July 2, 1957

2,798,093

METHOD FOR THE SEPARATION OF WATER-INSOLUBLE DICARBOXYLIC ACIDS FROM THEIR MIXTURES WITH OTHER WATER-INSOLUBLE MATERIALS

Werner Stein, Dusseldorf-Holthausen, Germany, assignor to Henkel & Cie. G. m. b. H., Dusseldorf-Holthausen, Germany, a corporation of Germany Application April 27, 1955, Serial No. 504,161

Claims priority, application Germany April 29, 1954

10 Claims. (Cl. 260—537)

This invention relates to a method for the separation of water-insoluble di-carboxylic acids from their mixtures with other water-insoluble components.

Water-insoluble di-carboxylic acids have heretofore been separated from mixtures containing both the di-carboxylic acids and water-insoluble mono-carboxylic acids by a process in which the mixture is washed with an aqueous solution of caustic soda. In this step both types of acids are dissolved in the aqueous solution as their sodium salts. They must then be precipitated from the solution and the mono-carboxylic acid removed from the di-carboxylic acid by dissolving it in a selective solvent, such as, petroleum ether.

It is the object of this invention to provide a method for the direct separation of water-insoluble di-carboxylic acids from mixtures containing such acids and other water-insoluble components.

It is a further object of this invention to provide a method for the direct separation of water-insoluble di-carboxylic acids from mixtures containing both the di-carboxylic acids and water-insoluble mono-carboxylic acid, without also separating the mono-carboxylic acid from the mixture.

A still further object of this invention is to provide a method by which a mixture of water-insoluble di-carboxylic acids can be separated from one another.

Other objects of this invention and its various advantages will appear in the detailed description which follows.

By the method in accordance with this invention water-insoluble di-carboxylic acids are separated from their mixtures with other water-insoluble components by extracting the mixture with a hot aqueous solution of a water-soluble salt of a poly-carboxylic acid which has the major portion of at least two carboxyl groups neutralized, and which preferably contains at least two completely neutralized carboxyl groups. The aqueous extract is then separated from the water-insoluble residue of the mixture and cooled, whereupon the di-carboxylic acid crystallizes from the aqueous solution. The water-insoluble di-carboxylic acids which may be separated by this method have the general structural formula:

$$R_x(COOH)_2$$

in which R is an organic radical, preferably a hydrocarbon radical, $x$ is the number of carbon atoms in the organic radical and an integer from four to twenty-five, preferably from five to twenty.

In carrying out this method using, for example, a hot aqueous solution of water-soluble, di-salt of a di-carboxylic acid to extract a water-insoluble di-carboxylic acid from its mixture with other water-insoluble materials, the di-salt of the di-carboxylic acid reacts, in the presence of heat, with the di-carboxylic acid to form the mono-salts of both acids. The mono-salts of the di-carboxylic acids are soluble in water and remain in the hot solution which is separated from the insoluble portion. When the solution cools, the reverse reaction takes place with the formation of the di-salt of the di-carboxylic acid and free di-carboxylic acid. The free di-carboxylic acid is water-insoluble and, therefore, crystallizes from the solution, while the di-salt of the di-carboxylic acid is water-soluble and remains in the solution. This aqueous solution of the di-salt of the di-carboxylic acid can then be reheated and used for another extraction step.

The mixtures which are treated by the method in accordance with this invention are water-insoluble mixtures which contain non-polymeric, non-aromatic, preferably purely aliphatic, di-carboxylic acids.

The mixtures treated may, for example, be mixtures of water-insoluble di-carboxylic acids with water-insoluble mono-carboxylic acids or other water-insoluble substances, particularly those which are non-saponifiable, such as, for example, hydrocarbons, alcohols, aldehydes, ketones, etc. The mixture may also include water-insoluble esters. These mixtures may, for example, be the product of splitting unsaturated fatty acids, or functional derivatives thereof, by oxidation to produce a mixture of water-insoluble mono-carboxylic acids and water-insoluble di-carboxylic acids. Such mixtures may, for example, be produced by splitting an unsaturated fatty acid in a single operation, as by treatment with nitric acid, chromic acid or ozone. Such mixtures may also be produced from intermediate products, for example, from epoxy, dioxy or halogenoxy derivatives of unsaturated fatty acids by splitting these molecules by known processes, for example, by the action of an alkali metal salt.

Mixtures treated by the method of this invention may be produced by the use of other processes, for example, by the oxidation of hydrocarbons of relatively high molecular weight. Mixtures of insoluble monocarboxylic acids and water-insoluble di-carboxylic acids may also be produced by the catalytic addition of carbon monoxide and hydrogen to poly-olefines, as well as to unsaturated alcohols, unsaturated aldehydes or unsaturated carboxylic acids, to produce compounds containing aldehyde groups which are then oxidized to carboxylic groups. The resulting mixtures may contain water-insoluble alcohols, aldehydes and ketones in addition to, or instead of, mono-carboxylic acids.

The water-soluble salts of the poly-carboxylic acids which are used in hot aqueous solution as extraction agents in the method in accordance with this invention are the salts of mono-basic compounds. The poly-carboxylic acids from which these salts are formed may themselves be either soluble or insoluble in water. These salts may, for example, be alkali metal salts, particularly salts of sodium or potassium, ammonium salts, or amino salts. The preferred water-soluble amino salts are those derived from amines and alkylol-amines having from one to three carbon atoms in the molecule, such as, for example, mono-ethyl amine, di-methyl amine, tri-ethyl amine, mono-ethanol amine, di-ethanol amine, tri-ethanol amine, propanol amine, and quaternary ammonium bases, such as, tetra-methyl ammonium hydroxide or tetra-ethyl ammonium hydroxide. The extraction solution utilized in this method may contain the salt of a poly-carboxylic acid and a single base, a mixed salt of a poly-carboxylic acid with two or more different basic compounds, or any combination of different salts of these types.

The extraction of the water-insoluble di-carboxylic acids from their water-insoluble admixture with other water-insoluble compounds may be carried out by bringing the mixture into intimate contact with an aqueous extraction solution at an elevated temperature, and then separating the two immiscible phases from each other. This may be done by first thoroughly admixing the two immiscible phases, allowing the mixture to stand and then separating the two phases, as, for example, by decantation. The phase separation may be assisted by centrifuging the liquid mixture or by any other suitable method. The extraction may be carried out in a continuous manner by the use of suitable continuous extraction apparatus, such as, for example, extraction columns, continuous centrifuges, and the like. This extraction step produces a hot solution of mono-salts of di-carboxylic acids and an extraction residue which is poor in the di-carboxylic acids or entirely free of di-carboxylic acids, depending upon the conditions under which the extraction is carried out.

The temperature at which the extraction step is carried out is preferably within the range of about 50° C. to about 100° C. However, if desired, higher temperatures, for example, up to about 250° C. may be used. The temperature at which the extraction operation is carried out should be selected in view of the solubility of the poly-carboxylic acid salts, particularly that of the mono-salts formed in the extraction operation. In all cases, the pressure on the mixture should be high enough to prevent the contents of the vessel from boiling.

Free di-carboxylic acid or acids can be separated from the aqueous solution resulting from the extraction step by precipitation with, for example, a mineral acid. It is more advantageous, however, to bring about the separation by cooling the aqueous extraction liquid. When the liquid has been sufficiently cooled, free di-carboxylic acids will precipitate from the solution, until the acid radicals still present in the solution are almost entirely or even completely transformed into poly-salts. The temperature differential utilized in this step of cooling the hot extraction solution depends upon both the solubilities of the various salts which are present in the solution and upon the concentration of the poly-salt of poly-carboxylic acids initially present in the aqueous extraction solution.

For example, in an embodiment of this method in which a water-insoluble, di-carboxylic acid has been extracted from its admixture with other water-insoluble material by the use of an aqueous solution of a mono-salt of a di-carboxylic acid, the increase in the concentration of the di-salt of the di-carboxylic acid is exactly equal to the decrease in the concentration of the mono-salts of di-carboxylic acid caused by the precipitation of free di-carboxylic acid upon cooling. It is possible in this step for the di-salts of the di-carboxylic acid to precipitate along with the free di-carboxylic acid near the end of the cooling step, depending upon the particular di-carboxylic acid involved, the concentration which its di-salt reaches during the cooling step and the temperature conditions involved. Although any di-salt of the di-carboxylic acid which is precipitated along with the free di-carboxylic acid, for example, may be removed by merely washing the precipitate with water, it is preferred to avoid such precipitation of the di-salt by a suitable choice of working conditions. Such precipitation of the di-salt of the di-carboxylic acid can be avoided by the use of lowered concentrations of the mono-salt of di-carboxylic acid in the hot aqueous extraction liquid, the use as the extraction liquid of solutions of mono-salts of di-carboxylic acids which are easily soluble in water even when in the form of the free acid, and the use of more than one cation in the initial extraction solution, i. e. a solution of two or more mono-salts of di-carboxylic acids having different cations.

The conditions applicable to salts of di-carboxylic acids can be utilized in this method with salts of poly-carboxylic acids having three or more carboxyl groups in the molecule, with adjustments made in view of the difference in molecular structure. When utilizing a salt of poly-carboxylic acid having three or more carboxyl groups as an extraction agent, it is not always necessary to have all of its carboxyl groups substantially completely neutralized as in the case of a di-carboxylic acid. It is necessary to neutralize its carboxyl groups only to an extent such that the resulting acidic salt has the desired degree of water-solubility. Such solubility is ordinarily achieved by the substantially complete neutralization of two of the carboxyl groups of each molecule. In general, it is usually preferred to neutralize the carboxyl groups of a poly-carboxylic acid having three or more carboxyl groups used in a hot extraction solution to the extent of about 40% to 80% of the overall number of groups present. However, for carrying out the extraction step at temperatures above about 100° C. the neutralization may be carried out to a lesser extent, with the result that even greater numbers of free carboxyl groups are present in the aqueous extraction solution.

The initial concentration of an incompletely neutralized poly-carboxylic acid in the hot aqueous extraction fluid can be chosen very readily in view of the conditions of concentration and temperature under which the precipitation of di-carboxylic acids is carried out in the cooling step. In any particular case the solubility conditions can be readily selected with the aid of solubility diagrams of the type illustrated by the Figures 1 to 4 which are referred to hereinafter in connection with specific exemplification of the method in accordance with this invention by Examples I, II and III.

In carrying out the method in accordance with this invention it is not necessary that the di-carboxylic acids in the form of their salts used as extraction agents be the same as the water-insoluble di-carboxylic acids which are to be extracted from a water-insoluble mixture. The extraction agent may be a salt of a poly-carboxylic acid which differs as to molecular size, as to the number of carboxyl groups per molecule, or both, from the di-carboxylic acid to be extracted.

The solutions of the salts of poly-carboxylic acids used as extraction liquids vary from approximately neutral to weakly acid. During the extraction step, the aqueous solution becomes increasingly more acid with increasing concentration of the solution. Upon precipitation of dissolved acid by cooling the solution, the pH of the solution again approaches its original value. The pH of the solutions fall within the range of about 7.5 to about 4. An excess of free base should not be present.

In carrying out this method, the aqueous extraction liquid is enriched with the poly-carboxylic acids with the shortest carbon chain or the highest acidity which are present in the system. When the aqueous extraction solution carries a salt of a poly-carboxylic acid which has a lower acidity than the di-carboxylic acid which is extracted from a water-insoluble mixture, the extraction agent becomes progressively enriched with the poly-carboxylic acid being extracted and the poly-carboxylic acid originally used in the form of its salt is displaced from the aqueous extraction solution. For this reason, it is usually desirable to utilize as an extraction agent a salt of a poly-carboxylic acid which is of shorter chain length or of higher acidity than the di-carboxylic acid which is to be extracted.

When using aqueous solutions of di-salts of di-carboxylic acids as the extraction agent in the method in accordance with this invention, it is not necessary to adjust the molar quantity of the di-salt of the di-carboxylic acid used to equal the molar amount of the di-carboxylic acid to be extracted. It is possible to employ an excess of the di-salt of the di-carboxylic acid without causing an insoluble mono-carboxylic acid which is present to be neutralized and as a consequence dissolved in the aqueous solution in the form of its salt. This matter is of primary importance in the operation of countercurrent extractors in a continuous process.

While the theoretical amount of a completely neutralized di-carboxylic acid to be used in this method is one mol for each mol of the free water-insoluble di-carboxylic acid to be extracted, the theoretical molar ratio required in a given instance may shift somewhat depending upon the degree of neutralization of the di-carboxylic acid salt utilized and upon the degree of solubility of the free dicarboxylic acids. When using salts of poly-carboxylic acids containing three or more carboxyl groups, the theoretical molar ratio may shift materially since the carboxylic acid salt may be only partially neutralized as noted hereinbefore.

In general, an excess of the salt of the poly-carboxylic acid is utilized in the extraction step of this method. The amount of the excess depends upon the desired degree of extraction and upon the efficiency of the extraction apparatus. It is possible to use an excess of the salt of the poly-carboxylic acid which is as much as twenty-five times the amount theoretically required to extract the water-insoluble poly-carboxylic acid present in the mixture being treated. In the majority of cases an amount of the salt of the poly-carboxylic acid within the range of about one to about ten times the theoretical requirement is sufficient to secure satisfactory extraction.

The method in accordance with this invention may be used to separate mixtures containing more than one water-insoluble di-carboxylic acid by fractionation to isolate the individual di-carboxylic acids. Fractional extraction of such mixtures can be achieved by repeatedly extracting the water-insoluble mixture with fresh aqueous extraction solutions, by changes in temperature during the extraction when operating continuously or by other suitable methods. In such fractional extraction processes, it is possible to work with a molar quantity of the salt of a di-carboxylic acid which is only about 0.2 the theoretical amount required. A fractional separation may be carried out, for example, by slowly cooling the solution of poly-carboxylic acids in the extraction agent and removing the precipitate in separate lots as it separates from the solution. By such fractional separation, whether by fractional extraction or fractional precipitation, it is possible to separate mixtures of different water-insoluble di-carboxylic acids which contain no components other than the di-carboxylic acids, into the individual di-carboxylic acids, as well as to separate individual di-carboxylic acids from the relatively complex water-insoluble mixtures containing such insoluble acids, which have been described hereinbefore.

In the accompanying drawings—

The method in accordance with this invention is further and more specifically illustrated by the examples which follow. Examples I, II and III illustrate the solubility conditions existing during the crystallization of various di-carboxylic acids from solutions of their respective mono-salts, while Example IV illustrates the operability of solutions of the di-sodium salts of different di-carboxylic acids as extraction agents for sebacic acid. Examples V to VIII, inclusive, illustrate the application of the method to different water-insoluble mixtures containing insoluble poly-carboxylic acids, under different conditions of operation.

EXAMPLE I

To demonstrate the solubility conditions existing during the cooling step of this method with mono-sodium salts of different water-insoluble poly-carboxylic acids, the mono-sodium salt of sebacic acid, the mono-sodium salt of decanedicarboxylic acid and the mono-sodium salt of brassylic acid, respectively, were dissolved in different portions of water at 100° C. to form solutions of different concentrations. These hot solutions were then slowly cooled to about room temperature, whereupon a precipitate appeared in each solution. In each case the precipitated crystals were rapidly filtered off and dried without further washing. The washing of the filter residue was omitted to avoid removing any salts which may have precipitated together with the free acid, and therefore to avoid giving a false impression of the purity of the filter residue.

The sodium content of the dry acid was analytically determined and from this value its content of the di-sodium salt of the di-carboxylic acid, the purity of the precipitated acid given in percent of free acid in the precipitate and the sodium loss from the solution of di-sodium salt of the di-carboxylic acid remaining as a mother liquor, were each calculated. The values thus determined are plotted in Figures 1, 2 and 3, in relation to the concentration of the mono-salt of the di-carboxylic acid in the corresponding original solution, expressed as percent by weight of free di-carboxylic acid.

Figure 1:
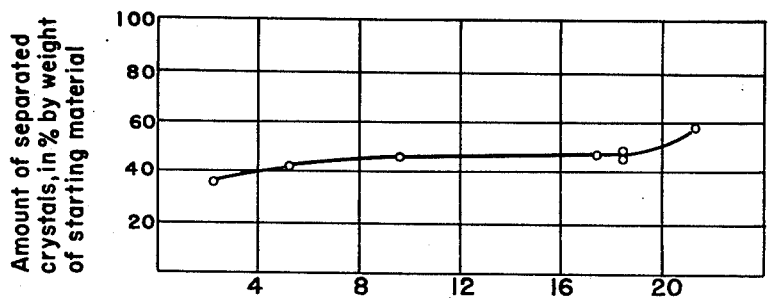
Fig. 1 illustrates the application of this process to the crystallization of sebacic acid from a hot solution of its mono-sodium salt.
Figure 1:
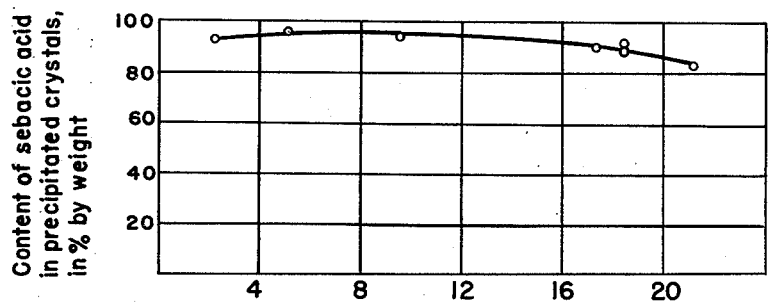
Figure 1:
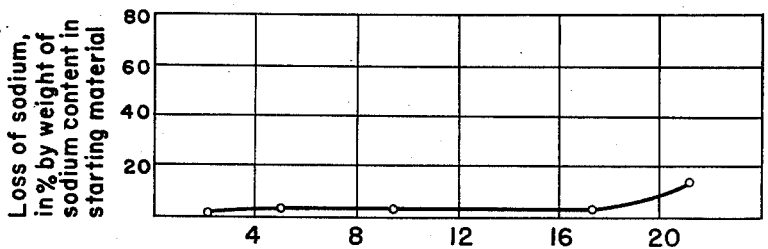
Figure 2:
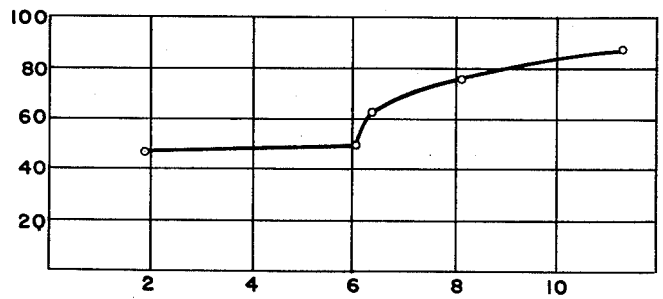
Fig. 2 illustrates the application of the process to the crystallization of decanedicarboxylic acid from a hot solution of its mono-sodium salt.
Figure 2:
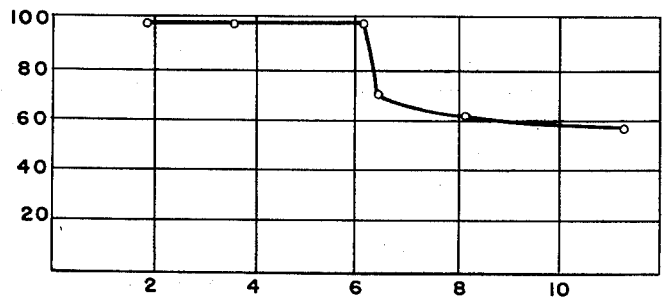
Figure 3:
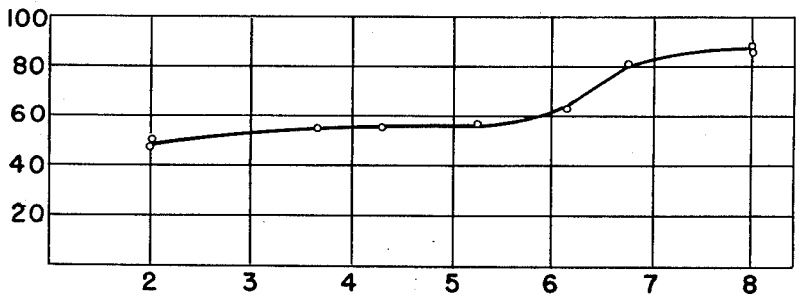
Fig. 3 illustrates the application of this process to the crystallization of brassylic acid from a hot solution of its mono-sodium salt.
Figure 3:
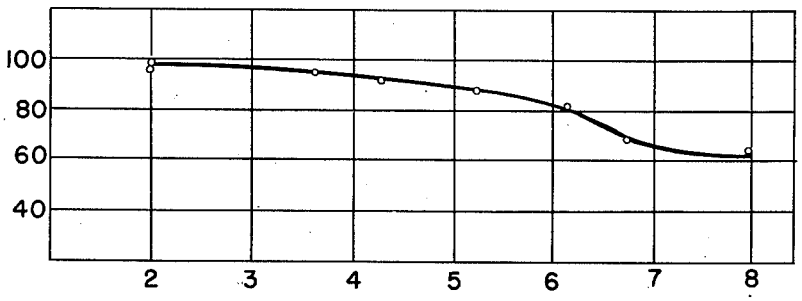
Figure 3:
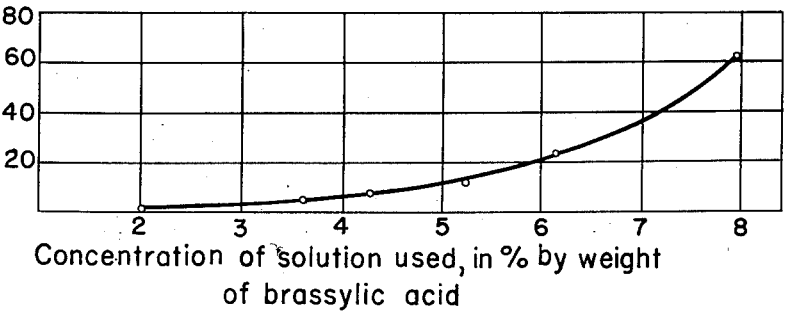

Referring to Figures 1, 2 and 3, it will be seen that with each of the di-carboxylic acids examined in this manner, it was found that the amount of the free di-carboxylic acid crystals separated remained virtually constant over a more or less wide range of concentrations of the initial solutions of the mono-sodium salts of the di-carboxylic acids. In this constant range, the precipitated free di-carboxylic acids were also very pure even though they still contained small amounts of the di-sodium salts of the di-carboxylic acid derived from the residual mother liquor which they carried when they were dried. The purity of the free di-carboxylic acids can be considerably improved by washing the filter cakes while still in the filter to remove the residual mother liquor. This is a step which is desirable in operating the process on a commercial scale.

At the point at which the amount of the precipitated, free di-carboxylic acid begins to increase with the increase in the concentration of the original solution of the mono-sodium salt of the di-carboxylic acid, the purity of the precipitated crystals begins to decrease and the loss of alkali from the mother liquor begins to increase. It is readily possible to determine the most favorable conditions for the extraction of any given water-insoluble mixture containing water-insoluble di-carboxylic acids, by the use of this test.

EXAMPLE II

Brassylic acid and trisodium citrate were dissolved together in a series of portions of hot water to form a series of hot solutions of different concentrations which contained equal stoichiometric amounts of mono-sodium brassylate and of di-sodium citrate. Each of these solutions was cooled to room temperature and the crystallized brassylic acid filtered out, dried without washing and analyzed to determine its purity as indicated by its sodium content.

Figure 4:
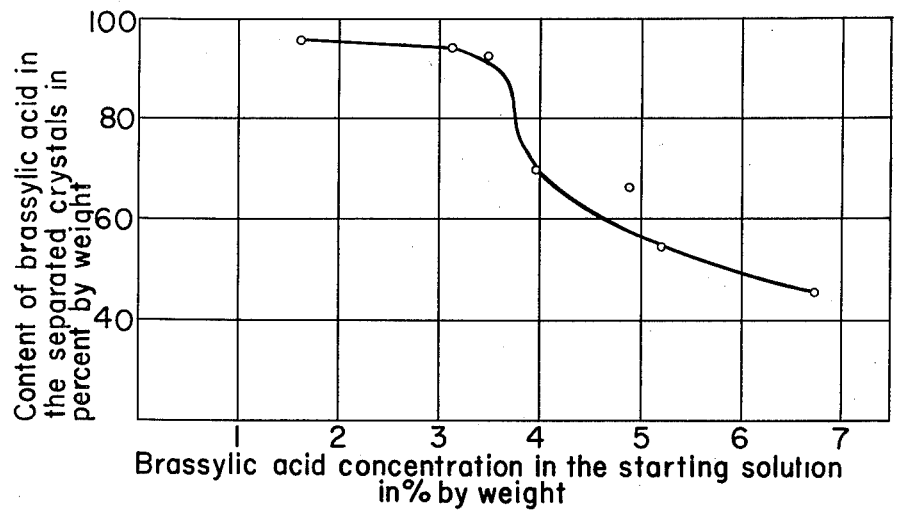
Fig. 4 illustrates the crystallization of brassylic acid from a hot solution of trisodium citrate.

In Figure 4 the degree of purity of the brassylic acid recovered from each of these solutions is plotted against content of mono-sodium brassylate, calculated as brassylic acid, which was contained in the original solution from which the particular lot of brassylic acid was recovered. Referring to Figure 4, it will be seen that at low concentrations of mono-sodium brassylate in the original hot solutions, the recovered brassylic acid contained about 4.5%, by weight, impurities. This content of impurities arose from the fact that the residual mother liquor was purposely not washed out of the filtered crystals. Further, it will be seen that the purity of the recovered brassylic acid dropped rather sharply at concentrations of the original mono-sodium brassylate solutions between 3% and 4%, by weight, calculated as brassylic acid. Figure 4, therefore illustrates clearly that it is desirable to utilize original solutions below 3%, by weight, with this particular combination of materials.

EXAMPLE III

The experiments described by Example II were repeated with brassylic acid, but with the substitution of the di-salt of dimethyl ammonium hydroxide and brassylic acid (di-dimethyl ammonium brassylate) for the tri-sodium citrate used in Example II. Paralleling Example II, brassylic acid and di-dimethyl ammonium brassylate were dissolved together to form a series of hot solutions of different concentrations which contained equal stoichiometric quantities of brassylic acid and of di-dimethyl ammonium brassylate, in the form of mono-dimethyl ammonium brassylate. These solutions were cooled, the crystallized brassylic acid filtered out, dried without removing the residual mother liquor and analyzed for purity.

Figure 5:
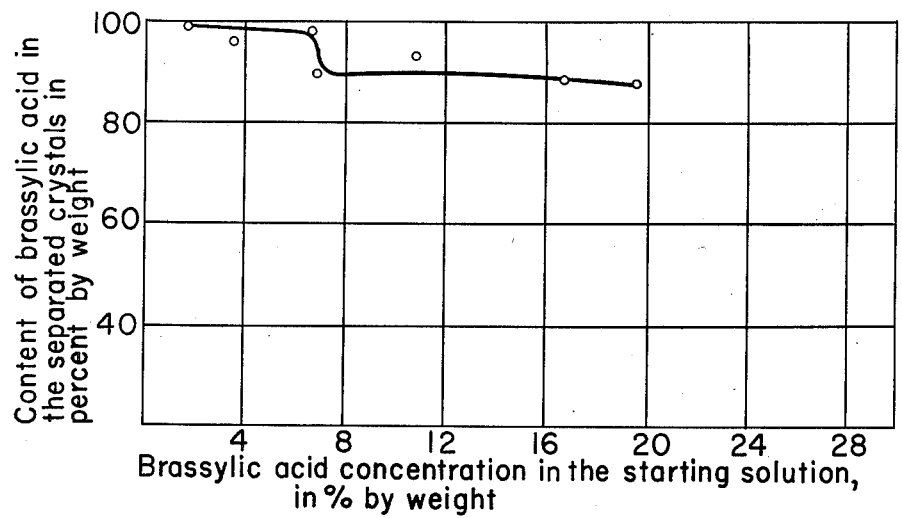
Fig. 5 illustrates the crystallization of brassylic acid from a hot solution of its dimethylammonium mono-salt.

Figure 5 shows the relationship between the purity of the precipitated brassylic acid and the concentration of the mono-dimethyl ammonium brassylate in the orginal hot solutions, expressed as brassylic acid. Reference to Figure 5 shows that the brassylic acid recovered from the hot solutions in which the original concentration of the mono-dimethyl ammonium brassylate, expressed as brassylic acid, is below about 7%, by weight, is of a high purity of about 97%, by weight, while the brassylic acid recovered from solutions in which the original concentration is above 7%, by weight, drops rather materially to a purity of about 85%, by weight.

EXAMPLE IV

To illustrate the operability of solutions of the disalts of different di-carboxylic acids as extraction agents, equimolar amounts of free sebacic acid and of each of the di-sodium salts of the di-carboxylic acids listed in Table I were dissolved in separate portions of hot water to produce solutions containing the percentages of monosodium sebacate, calculated as sebacic acid shown by the table.

Table I

| Disodium Salts of— | Concentration of Mono-Sodium Sebacate Calculated as Free Sebacic Acid in Percent by Weight | pH of the Hot Solutions of Mono-salts | Purity of the Recovered Sebacic Acid in Percent by Weight |
| --- | --- | --- | --- |
| Oxalic Acid | 3.8 | 4.6–4.9 | 97 |
| Succinic Acid | 4.3 | 4.6–4.9 | 97 |
| Adipic Acid | 4.5 | 4.9 | 97 |
| Phthalic Acid | 5.5 | not measured | 99 |
| Sebacic Acid | 4.5 | 5.5 | 95 |

An inspection of Table I will show that each of the di-sodium salts of the several di-carboxylic acids listed was an efficient extraction agent and gave a recovered sebacic acid of relatively high purity.

EXAMPLE V

In this example, 5,500 grams of a mixture of water-insoluble di-carboxylic acid and water-insoluble mono-carboxylic fatty acid consisting primarily of brassylic acid were extracted. This mixture was produced by oxidizing a mixture of unsaturated fatty acids with chromic acid and then separating the water-soluble mono-carboxylic acids present by vacuum distillation at a temperature of 130° C., while under a pressure of two millimeters of mercury. The water-insoluble di-carboxylic acid content of this mixture was approximately 80%, by weight.

An aqueous extraction liquid containing di-sodium salts of di-carboxylic acids was prepared by stirring 1000 grams of the above mixture containing di-carboxylic acids with a solution of 160 grams of sodium hydroxide in thirty liters of water, at a temperature of 95° C. This preparation of the extraction liquid was combined with the first extraction step by continuing the mixing of the two-phase dispersion for fifteen minutes after its initial production. The stirring was then stopped, the different phase allowed to separate and the aqueous phase was separated from the oily phase. The aqueous phase was permitted to cool to room temperature and a precipitate of free di-carboxylic acids crystallized from the solution. This precipitate was filtered from the solution with the use of suction, the resultant filter cake was admixed with a small amount of water in the filter and again filtered with the use of suction. The filtrate produced by the wash water was recovered separately from the mother liquor.

The solution of di-sodium salts of di-carboxylic acid thus recovered as the mother liquor was used as the extraction agent in subsequent extraction steps. Four portions of 500 grams each of the original carboxylic acid mixture were successively extracted with the total volume of the mother liquor resulting from the first extraction step, and in each step a filtrate was separated and washed as in the first step.

The extraction residues of each of these five extraction steps were combined, subdivided into 500 gram portions and each portion again extracted in successive steps with the mother liquor left from the first series of extractions. In each successive step, a filtrate was separated and washed as in the first step.

Five portions of 500 grams each of the initial fatty acid mixture were successively extracted with the total quantity of mother liquor left from the foregoing extractions by the same procedure and the extraction residues combined and re-extracted in successive 500 gram portions by the same procedure as with the first series of re-extractions.

The di-carboxylic acids precipitated, recovered from the mother liquor and washed in each of the foregoing extraction steps, were combined, dried and found to have a di-carboxylic acid content of about 97% to about 98%, by weight. Repeated washing with water produced a substantially pure di-carboxylic acid.

From the original 5,500 grams of the mixture containing both water-insoluble di-carboxylic acid and water-insoluble mono-carboxylic acid, 3,850 grams of brassylic acid and 850 grams of mono-carboxylic fatty acid were recovered by the foregoing procedure. The final mother liquor contained 680 grams of di-carboxylic acid in the form of the di-sodium salt. The apparent loss of 120 grams of material was caused by repeated withdrawal of samples.

EXAMPLE VI

Thirty liters of technical grade oleic acid which contained 7%, by weight, of sebacic acid were vigorously stirred with thirty liters of a solution of 7.5%, by weight, of di-sodium adipate at a temperature of 90° C. This hot mixture was then passed from the agitating vessel into a fully jacketed disk separator in which it was separated into an oily phase and an aqueous phase. The aqueous phase contained an amount of di-sodium adipate in excess of the theoretical quantity required for the separation of the sebacic acid as mono-sodium sebacate. This solution was slowly cooled to room temperature to cause the crystallization of sebacic acid contained therein. The sebacic acid was filtered from the mother liquor and a yield of 1,560 grams with a purity of 98%, by weight, was recovered.

The mother liquor recovered from the separation of the precipitated sebacic acid was used for a second extraction of the oleic acid-sebacic acid residual mixture and the extracted sebacic acid separated therefrom by cooling and filtration. This extraction and separation of sebacic acid was repeated three times in the same manner. These five successive extraction steps gave a total recovery of 90%, by weight, of the sebacic acid originally contained in the oleic acid.

EXAMPLE VII

Forty liters of technical grade olein which had 7%, by weight, of a mixture of water-insoluble di-carboxylic acids, consisting principally of sebacic acid dissolved therein, were extracted counter-currently at a temperature of 90° C. with an aqueous solution of di-sodium oxalate. The counter-current extraction was carried out in a Podbielniak extraction centrifuge. The aqueous extraction solution was used in an amount, by weight, about 4 to 5 times the weight of the olein mixture. The aqueous solution withdrawn from the centrifuge was cooled and the di-carboxylic acids which crystallized therefrom were separated by filtration. The precipitate was washed once with one liter of water. The di-carboxylic acids recovered in this manner were more than 98%, by weight, pure. The residual oil phase consisted of water-insoluble mono-carboxylic fatty acids and was practically free from di-carboxylic acids.

EXAMPLE VIII

A solution of di-carboxylic acids in olein, identical with that described in Example VII, was extracted in a Podbielniak centrifuge at a temperature of 80° C. to 90° C., with three times its weight of a solution containing 9.2%, by weight, of di-sodium sebacate dissolved in water. A single pass through the apparatus, subsequent cooling to room temperature and filtration of the aqueous extraction liquid gave a yield of 80%, by weight, of the sebacic acid originally dissolved in the olein.

The term "insoluble" is used in the foregoing to characterize the di-carboxylic acids which are extracted by the method in accordance with this invention in a relative sense, and includes such compounds which have a solubility in water too low (upper limit: 5% by weight at 20° C.) to permit their extraction from admixture with water-insoluble materials by the use of water alone on a practical basis, as well as such compounds which have no solubility in water.

From the foregoing, it will be readily apparent to those skilled in the art that the method in accordance with this invention can be utilized for the separation of water-insoluble di-carboxylic acids from water-insoluble mixtures containing such acids, which are produced in a wide variety of different sources. Further, it will be apparent that the method itself is quite flexible and capable of adaptation to the treatment of specific mixtures to obtain maximum efficiency; since a wide variety of poly-salts of poly-carboxylic acids may be used in the hot extraction liquid, both the temperature range over which the cooling step is carried out and the rate of the cooling can be adjusted over wide ranges, and the relative portions of the mixture being extracted and of extraction liquid, as well as the number of extraction steps to which the water-insoluble mixture is subjected, can be widely varied.

The poly-carboxylic acids whose partial or complete neutralization products are used to extract the water-insoluble di-carboxylic acids should have a molecular size not higher than the di-carboxylic acids to be extracted. These poly-carboxylic acids may contain aliphatic, cyclo-aliphatic, aromatic or heterocyclic organic radicals. The number of carboxylic groups present in one molecule may range from 2 to 6. Specific examples of such acids are malonic acid, glutonic acid, butane-tricarboxylic acid, diglycolic acid, terephthalic acid, pyromellitic acid and mellitic acid.

While I have given specific examples of the practice of my method, it will be understood that these examples are for the purposes of illustration and that various modifications and changes may be made from these examples without departing from the spirit of my invention or the scope of the following claims. While various theories have been given for the purpose of explaining the behavior of the materials used in my method and of the influence of the several variables involved in its application, I do not intend to be bound by these theories.

I claim:
1. A method for the separation of non-aromatic water-insoluble di-carboxylic acids from their mixtures with other water-insoluble materials, which comprises extracting the said water-insoluble mixture with a hot, aqueous solution of a salt of a poly-carboxylic acid, which has at least two carboxyl groups substantially completely neutralized by mono-basic cations, and separating precipitated non-aromatic di-carboxylic acid from the extraction solution.

2. A method for the separation of non-aromatic water-insoluble di-carboxylic acids from their mixtures with other water-insoluble materials, which comprises extracting the said water-insoluble mixture with a hot, aqueous solution of a salt of a poly-carboxylic acid, which has at least two carboxyl groups substantially completely neutralized by mono-basic cations, cooling the hot aqueous solution resulting from the said extraction step, and separating precipitated non-aromatic di-carboxylic acid from the cooled solution.

3. A method for the separation of non-aromatic water-insoluble di-carboxylic acids having the structural formula:

$$R_x(COOH)_2$$

in which R is a non-aromatic organic radical, $x$ is the number of carbon atoms in the said organic radical and an integer from four to twenty-five, from their mixtures with other water-insoluble organic materials, which comprises extracting the said water-insoluble mixture with a hot, aqueous solution of a salt of a poly-carboxylic acid, which has at least two carboxyl groups substantially completely neutralized by mono-basic cations, cooling the hot aqueous solution resulting from the said extraction step, and separating precipitated non-aromatic di-carboxylic acid from the cooled solution.

4. A method for the separation of non-aromatic water-insoluble di-carboxylic acids having the structural formula:

$$R_x(COOH)_2$$

in which R is a non-aromatic organic radical, $x$ is the number of carbon atoms in the said organic radical and an integer from five to twenty, from their mixtures with other water-insoluble organic materials, which comprises extracting the said water-insoluble mixture with a hot, aqueous solution of a salt of a poly-carboxylic acid, which has at least two carboxyl groups substantially completely neutralized by mono-basic cations, cooling the hot aqueous solution resulting from the said extraction step, and separating precipitated non-aromatic di-carboxylic acid from the cooled solution.

5. A method for the separation of non-aromatic water-insoluble di-carboxylic acids from their mixtures with water-insoluble mono-carboxylic acids, which comprises extracting the said water-insoluble mixture with a hot, aqueous solution of a salt of a di-carboxylic acid, which has at least two carboxyl groups substantially completely neutralized by mono-basic cations, cooling the hot aqueous solution resulting from the said extraction step, and separating precipitated non-aromatic di-carboxylic acids from the cooled solution.

6. A method for the separation of non-aromatic water-insoluble di-carboxylic acids from their mixtures with other water-insoluble materials, which comprises extracting the said water-insoluble mixture with a hot, aqueous solution of a salt of a di-carboxylic acid which has its carboxyl groups substantially completely neutralized by mono-basic cations, cooling the hot, aqueous solution resulting from the said extraction step to cause the crystallization of free, non-aromatic di-carboxylic acid therefrom and separating the said crystallized di-carboxylic acid from the said solution.

7. A method for the separation of non-aromatic water-insoluble di-carboxylic acids from their mixtures with other water-insoluble materials, which comprises extracting the said water-insoluble mixture with a hot, aqueous solution of a salt of a poly-carboxylic acid, which has at least two carboxyl groups substantially completely neutralized by mono-basic cations, cooling the hot aqueous solution resulting from the said extraction step to cause the precipitation non-aromatic di-carboxylic acid therefrom, separating the said precipitated di-carboxylic acid from the said solution, reheating the said solution, extracting a water-insoluble mixture containing non-aromatic water-insoluble di-carboxylic acids with the said hot, aqueous solution, cooling the said hot solution to cause the precipitation of non-aromatic di-carboxylic acid and separating the precipitated non-aromatic di-carboxylic acid from the said solution.

8. A method for the separation of non-aromatic water-insoluble di-carboxylic acids from their mixtures with other water-insoluble materials, which comprises extracting the said water-insoluble mixture with a hot, aqueous solution of a salt of a poly-carboxylic acid, which has at least two carboxyl groups substantially completely neutralized by mono-basic cations, cooling the hot aqueous solution resulting from the said extraction step to cause the precipitation of non-aromatic di-carboxylic acid therefrom, separating the said precipitated di-carboxylic acid from the said solution, reheating the said solution, extracting a water-insoluble mixture containing non-aromatic water-insoluble di-carboxylic acids with the said hot, aqueous solution, cooling the said hot solution to cause the precipitation of non-aromatic di-carboxylic acid, separating the precipitated di-carboxylic acid from the said solution and repeating the said steps in which the aqueous solution separated from precipitated di-carboxylic acid is used as an extraction agent for the separation of non-aromatic di-carboxylic acid.

9. A method for the fractionation of a water-insoluble mixture containing a plurality of non-aromatic water-insoluble di-carboxylic acids to separate the said non-aromatic water-insoluble di-carboxylic acids from each other which comprises extracting the said water-insoluble mixture with a hot aqueous solution of a poly-carboxylic acid which has at least two carboxyl groups substantially completely neutralized by mono-basic cations, slowly cooling the hot aqueous solution and separating successive portions of precipitated, non-aromatic di-carboxylic acid from the said solution during the course of the said cooling.

10. A method for the fractionation of a water-insoluble mixture containing a plurality of non-aromatic water-insoluble di-carboxylic acids to separate the said non-aromatic water-insoluble di-carboxylic acids from each other which comprises extracting the said water-immiscible mixture with successive, separate hot, aqueous solutions of a polycarboxylic acid which has at least two carboxyl groups substantially completely neutralized by mono-basic cations, cooling each of the said solutions to cause the precipitation of non-aromatic di-carboxylic acid therefrom and separating the precipitated non-aromatic di-carboxylic acid from each of said solutions.

References Cited in the file of this patent
UNITED STATES PATENTS

| | | |
|---|---|---|
| 2,229,995 | Yabroff et al. | Jan. 28, 1941 |
| 2,323,061 | Lehmann et al. | June 29, 1943 |
| 2,713,067 | Hamblet et al. | July 12, 1955 |